(12) United States Patent
Mao et al.

(10) Patent No.: US 9,210,650 B2
(45) Date of Patent: Dec. 8, 2015

(54) TERMINAL ACCESS METHOD AND DEVICE

(75) Inventors: Lei Mao, Shenzhen (CN); Mian Li, Shenzhen (CN); Yun Deng, Shenzhen (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 201 days.

(21) Appl. No.: 13/980,417

(22) PCT Filed: Aug. 17, 2011

(86) PCT No.: PCT/CN2011/078521
§ 371 (c)(1),
(2), (4) Date: Jul. 18, 2013

(87) PCT Pub. No.: WO2012/097589
PCT Pub. Date: Jul. 26, 2012

(65) Prior Publication Data
US 2013/0308541 A1    Nov. 21, 2013

(30) Foreign Application Priority Data

Jan. 21, 2011    (CN) .......................... 2011 1 0024033

(51) Int. Cl.
*H04W 48/06*    (2009.01)
*H04W 48/10*    (2009.01)

(52) U.S. Cl.
CPC .............. *H04W 48/10* (2013.01); *H04W 48/06* (2013.01)

(58) Field of Classification Search
CPC ............................ H04W 48/10; H04W 48/06
USPC ........................................................ 370/328
See application file for complete search history.

(56) References Cited

U.S. PATENT DOCUMENTS 8,738,075 B2 * 5/2014 Zhang .................. H04W 48/06
                                                         455/404.1
8,938,233 B2 * 1/2015 Hsu ...................... H04W 48/02
                                                         455/404.1
(Continued)

FOREIGN PATENT DOCUMENTS

CN    101547492 A    9/2009
CN    101925151 A    12/2010
(Continued)

OTHER PUBLICATIONS

S1-110409, 'Clarifications for Extended Access Barring', Feb. 14-18, 2011, 3GPP TSG-SA WG1 Meeting #53, pp. 1-4.*
(Continued)

*Primary Examiner* — Melvin Marcelo
(74) *Attorney, Agent, or Firm* — Oppedahl Patent Law Firm

(57) ABSTRACT

The disclosure provides a terminal access method and a terminal access device. The method comprises: determining, according to a value within an Enhanced Access Barring (EAB) parameter corresponding to an Access Class (AC) configured by a system, whether to allow access of a terminal corresponding to the AC; when the corresponding AC is determined to be not barred according to the EAB parameter, then according to a common Access Class Barring (ACB) parameter broadcasted by the existing system, performing access allowed judgment; when the corresponding AC is determined to be barred according to the EAB parameter, then, according to a barring time parameter configured by the system, calculating a barring time for re-accessing the system. In the method of the disclosure, the EAB and the existing ACB mechanism are jointly processed, solving the problem of possible impact on a system caused when large numbers of delay-insensitive or low-priority services or terminals access a network simultaneously. Also, during the occurrence of an unexpected event, as the EAB applicable terminal is provided with appropriate control, this type of terminal is prevented from accessing the system directly without constraints, and the duration of system congestion during the unexpected event is shortened.

10 Claims, 1 Drawing Sheet

(56) References Cited

U.S. PATENT DOCUMENTS

| | | | |
|---|---|---|---|
| 8,948,751 B2* | 2/2015 | Zhang | H04W 48/06 455/404.2 |
| 2013/0045706 A1* | 2/2013 | Hsu | 455/404.1 |
| 2014/0329503 A1* | 11/2014 | Deng | 455/411 |

FOREIGN PATENT DOCUMENTS

| | | |
|---|---|---|
| JP | 2009212915 A | 9/2009 |
| JP | 2009268105 A | 11/2009 |
| JP | 2013513993 A | 4/2013 |

OTHER PUBLICATIONS

International Search Report in international application No. PCT/CN2011/078521, mailed on Nov. 24, 2011.

English Translation of the Written Opinion of the International Search Authority in international application No. PCT/CN2011/078521, mailed on Nov. 24, 2011.

Service accessibility; Dec. 31, 2010.

Further Discussion on EAB; May 13, 2011.

3GPP TSG-SA WG1 Meeting #52, Access Control for Machine Type Communications, Malta, Vodafone, Nov. 8, 2010.

3GPP TS 22.011 V10.2.0, 3rd Generation Partnership Project, Technical Specification Group Services and System Aspects, Service accessibility (Release 10), Dec. 2010.

3GPP TS 22.011 V10.3.0, 3rd Generation Partnership Project, Technical Specification Group Services and System Aspects, Service accessibility (Release 10), Apr. 2011.

* cited by examiner

TERMINAL ACCESS METHOD AND DEVICE

TECHNICAL FIELD

The disclosure relates to the Machine Type Communication (MTC) technology, and in particular to a terminal access method and a terminal access device.

BACKGROUND

Human to Human (H2H) communication refers to the communication between people, which is implemented by operating equipment. Existing radio communication technology is developed based on the H2H communication. In the H2H communication, people perform communication by means of H2H equipment, that is, User Equipment (UE) in general. While, Machine to Machine (M2M) is defined as communication from a machine to a machine in a narrow sense, and networked application and service with intelligent interaction between machine terminals as a core in a broad sense. The M2M technology is an informatization solution provided for customers with multiple communication modes as access means, based on intelligent machine terminal, to satisfy informatization requirements of the customer on monitoring, commanding and scheduling, data collection and measurement.

The development of radio technology is an important factor for the development of an M2M market. The M2M technology breaks through time and space constraints and geographical barriers of conventional communication mode, so that enterprises and the public can get rid of cable constraints, and customers can control cost more effectively, save installation charge and enjoy simple and convenient usage. In addition, growing requirements are pushing the M2M technology to progress continuously. Contradict with the continuous growth of information processing capability and network bandwidth, the means of information acquisition lags far behind, however, the M2M technology can well satisfy this requirement. Through the M2M technology, external environment can be monitored in time, and large-scale automated information collection can be realized. Therefore, the M2M technology can be widely employed in industry application, household application, personal application and the like, in which the industry application includes traffic monitoring, alarm system, sea rescue, vending machine, driving pay and the like, the household application includes automatic meter reading, temperature control and the like, and the personal application includes life detection, remote diagnosis and the like.

The communication object of the M2M technology is machine to machine, man to machine. Data communication between one or more machines is defined as Machine Type Communication (MTC), in which less man-machine interaction is needed. A machine participating in MTC is defined as an MTC device (MD). The MTC device is a terminal of an MTC user, which can communicate with an MTC device and an MTC server through a Public Land Mobile Network (PLMN).

After M2M application is introduced, existing systems can be optimized according to the feature of the M2M application, so as to meet requirements of the M2M application and not to impact common UEs in the existing systems. Some significant features of the M2M application include: large number of MTC devices, small amount of data transmitted each time, big transmission interval, relatively fixed position and the like. Since the number of MTC device is large, not in the same class as the number of common UE, that is, H2H device, the wide use of MTC device probably could cause an overload state of network, for example, if a cell suffers a power failure event suddenly, when the power is recovered, numerous MTC devices probably could try to access network simultaneously, thus causing an overload state of network.

At present, overload control of a Long Term Evolution (LTE) system is divided into two levels: overload control of an access network and overload control of a core network, in which the overload control of the access network aims at the load of evolved Node B (eNB) only. If the access network has no overload, the request information of a terminal would be sent to the core network; if the core network has overload, the core network returns a reject message to the terminal, then the terminal exits the system and signalling links previously established are released.

For the overload control of the access network, the access of terminal to a system can be controlled through an Access Class Barring (ACB) mechanism. The execution process of the ACB mechanism adopted by the LTE system is introduced below.

Operators define terminal types into 16 Access Classes (ACs), in which AC 0-AC 9 belongs to normal class and is allocated to terminals randomly, AC 10 indicates emergency calls (not allocated to terminals), AC 11 is used for network operations, AC 12 indicates safety services, AC 13 indicates public services (for example, water and gas suppliers), AC 14 indicates emergency services, and AC 15 indicates operator working staff. One terminal can be configured as one class within AC 0-AC 9 and one or more classes within AC 11-AC 15, and the configuration information is stored in a Subscriber Identity Module (SIM) card.

In the LTE system, a system message would broadcast an ACB parameter, through which ACB control can be performed on the emergency call, MO-signalling initiated by a terminal, MO-data initiated by a terminal, Multimedia Language (MMTEL-Voice) and MMTEL-Video. The emergency call can be configured with Barred or Allowed (not barred) only. In other conditions, the network would configure a barring factor and a barring time. The terminal generates a random number between 0 and 1; if the random number is greater than the barring factor, re-access is not allowed within [(0.7+0.6*rand)*ac-barring time], and later the terminal can try to access the system again; otherwise, the terminal is allowed to access the system. In addition, the control on AC 0-AC 9 is the same as the above in the ACM mechanism. For AC 11-AC 15, the network can configure separately whether to bar the access of these classes of users. In the above formula, the rand represents a random number generated by the terminal; and the ac-barring time represents a barring time preconfigured by the system.

If a UE is configured with AC 11-AC 15 and AC 0-AC 9, for the MO data/signalling, it is judged first whether BarringForSpecialAC corresponding to AC 11-AC 15 is barred; if not, the UE accesses the system directly; otherwise, ACB control is performed according to the parameter of AC 0-AC 9. For the emergency call, it is judged first whether ac-BarringForEmergency configured in SIB2 is barred; if not, the UE accesses the system directly; otherwise, it is judged whether the AC corresponding to the ac-BarringForSpecialAC in a data service (ac-BarringForMO-Data) initiated by the barred terminal is barred; if so, the emergency call can not be initiated; otherwise, access is allowed.

After the MTC device is introduced, for preventing impact on a system caused by simultaneous access of large numbers of devices, the ACB mechanism is a very good solution, which can control the time and frequency of a terminal accessing the system, thereby reducing the impact on the system caused by large numbers of terminal from the source. Moreover, since the MTC device generally is of low priority and is delay-insensitive, a strict access control policy can be adopted.

After new service types (or terminal types) are introduced, since these new types generally are considered as delay-insensitive or low-priority services or terminals, in order to fine control and not to impact existing common terminals, it is needed to enhance the existing ACB mechanism, also called Enhanced ACB (EAB). The main enhancement mode includes two modes as follows.

One mode is to extend the number of AC classes, that is, allocate new AC class values for new service types (or terminal types), exceeding the existing 15 classes. The newly allocated AC class can adopt the same control mechanism, but needs to extend the scope of corresponding parameters. For example, add new AC, class 20-class 29 indicates Extended Access Class (EAC) and class 30-class 39 indicates Extended Access Class Low Priority (EAC Low Priority); for the newly added AC, network side can broadcast two sets of different parameters; UEs configured with EAC or EAC Low Priority would neglect broadcast information related to AC 0-AC 9 and AC 11-AC 15.

The other mode is to configure an extra set of parameters for new service types (or terminal types) to perform control in conjunction with the existing AC classes, without extending the number of AC classes: a terminal is configured with a low access priority; network side broadcasts the existing ACB parameters, and meanwhile broadcasts 10 new EACB bits (for normal classes 0-9 information, that is, 10 bits configured in the EACB parameter, in which bit 1 points to a user of AC 0, bit 2 points to a user of AC 1 . . . bit 10 points to a user of AC 9). In the 10 new EACB bits (for normal classes 0-9 information), 0 indicates not barred, and 1 indicates barred; if the first bit is 1, it is indicated that an EAB applicable terminal corresponding to AC 0 is not allowed to have the access. If an EAB applicable UE is configured with AC 0-AC 9, the ACB parameter corresponding to AC 0-AC 9 is neglected and the EAB parameter is used; if the EAB applicable UE is configured with AC 11-AC 15, the EAB parameter is neglected and the ACB parameter corresponding to AC 11-AC 15 is used. The EAB broadcast information consists of: EAB 0-9 bits and EAB applicable UE types. If a UE configured with EAB initiates an emergency call, the UE neglects the EAB information. If the network does not broadcast EAB information, the UE uses the ACB parameter to perform judgment.

In the above EAB scheme, since the EAB parameter is enumerated (Eumm), that is, barred, not barred, once the EAB parameter is configured, the EAB applicable terminal corresponding to some AC(s) would be barred directly or the EAB applicable terminal corresponding to some AC(s) would be allowed directly. If the EAB applicable terminal performs access time control depending on the EAB parameter only, but on the existing ACB mechanism, once this type is allowed to have the access, it is equivalent that the EAB applicable terminal is endowed with a higher priority, this is unreasonable, because the EAB applicable terminal generally is the type of delay-insensitive or low-priority services or terminals. For example, if MTC terminals of AC5 corresponding to EAB are allowed to have the access, then this type of terminals can access system directly; however, normal terminals of AC 5 need to calculate probability according to the ACB parameter, and probably are not allowed to have the access. In this way, it is equivalent that the EAB applicable terminal has a higher priority than the normal terminal; this terminal access is unreasonable, and further system impact could be caused.

SUMMARY

In view of the above, the main purpose of the disclosure is to provide a terminal access method and a terminal access device, so as to enable reasonable access of a terminal and to reduce impact on a system caused by the simultaneous access of large numbers of devices.

In order to achieve the purpose above, the technical scheme of the disclosure is realized as follows.

The disclosure provides a terminal access method, which includes: determining, according to a value within an Enhanced Access Barring (EAB) parameter corresponding to an Access Class (AC) configured by a system, whether to allow access of a terminal corresponding to the AC;

when the corresponding AC is determined to be not barred according to the EAB parameter, then, according to an existing and common Access Class Barring (ACB) parameter broadcasted by the system, performing access allowed judgment.

The terminal access method may further include: when the corresponding AC is determined to be barred according to the EAB parameter, calculating, by the terminal, a barring time for re-accessing the system according to a barring time parameter configured by the system.

The terminal access method may further include: before determining whether to allow access of a terminal corresponding to the AC, determining that the terminal is configured with one or more classes within special AC 11-AC 15 and that a value of the terminal corresponding to the special AC is barred; or, determining that the terminal is not configured with one or more classes within the special AC 11-AC 15.

The determining that the terminal is configured with one or more classes within special AC 11-AC 15 and that a value of the terminal corresponding to the AC is barred may include:

determining, by the terminal, whether it is configured with one or more classes within the special AC 11-AC 15; if so, performing access judgment according to a specific parameter of the AC 11-AC 15;

when the specific parameter of the AC 11-AC 15 is configured as that the value of the terminal corresponding to the AC is not barred, allowing the terminal to access the system directly and ending the process;

when the specific parameter of the AC 11-AC 15 is configured as that the value of the terminal corresponding to the AC is barred, then determining that the terminal is configured with a class within the special AC 11-AC 15 and that the value of the terminal corresponding to the AC is barred, and executing the determining, according to the value within the EAB parameter corresponding to the AC configured by the system, whether to allow the access of the terminal corresponding to the AC.

A terminal access device at least includes an Access Class Barring (ACB) processing module and an Enhanced Access Barring (EAB) processing module, wherein the ACB processing module is configured to send a processing notification to the EAB and to perform ACB processing;

the EAB processing module is configured to receive the processing notification from the ACB processing module, and to determine, according to a value within an EAB parameter corresponding to an Access Class (AC) configured by a system, whether to allow access of a terminal corresponding to the AC; specifically, the EAB processing module is configured to: when the corresponding AC is determined to be barred according to the EAB parameter, determine that a cell does not allow the access of the terminal and calculate a barring time for re-accessing the system according to a barring time parameter configured by the system; and, when the corresponding AC is determined to be not barred according to the EAB parameter, determine that the cell allows the terminal to continue performing access allowed judgment according to an existing and common ACB parameter broadcasted by the system.

The ACB processing module may be further used in the following conditions:

the terminal determines whether it is configured with one or more classes within special AC 11-AC 15, if so, the terminal performs access judgment according to a specific parameter of the special AC 11-AC 15; specifically: when the specific parameter of the AC 11-AC 15 is configured as that the value of the terminal corresponding to the special AC is not barred, it is determined that the terminal is allowed to access the system directly, then the ACB processing module no longer sends a processing notification to the EAB or sends a no-processing notification to the EAB; when the specific parameter of the AC 11-AC 15 is configured as that the value of the terminal corresponding to the special AC is barred, it is determined that the terminal is configured with a class within the AC 11-AC 15 in the ACB mechanism and that the value of the terminal corresponding to the special AC is barred, then the ACB processing module sends a processing notification to the EAB, or, it is determined that the terminal is not configured with one or more classes within the special AC 11-AC 15, then the ACB processing module sends a processing notification to the EAB.

The ACB processing module may be further configured to perform ACB judgment when the EAB processing module determines that the terminal is allowed to access the system.

The device may be arranged in the terminal, and the terminal may be an EAB applicable terminal.

From the above technical scheme provided by the disclosure, it can be seen that the scheme includes: determining, according to the value within an EAB parameter corresponding to an Access Class (AC) configured by a system, whether to allow access of a terminal corresponding to the AC; if the corresponding AC is determined to be not barred according to the EAB parameter, then, according to a common ACB parameter broadcasted by the existing system, performing access allowed judgment; if the corresponding AC is determined to be barred according to the EAB parameter, calculating a barring time for re-accessing the system according to a Barring Time parameter configured by the system.

In the method of the disclosure, the EAB and the existing ACB mechanism are jointly processed, solving the problem of possible impact on a system caused when large numbers of delay-insensitive or low-priority services or terminals access a network simultaneously. Also, during the occurrence of an unexpected event, as the EAB applicable terminal is provided with appropriate control, this type of terminal is prevented from accessing the system directly without constraints, and the duration of system congestion during the unexpected event is shortened.

DETAILED DESCRIPTION

Figure 1:
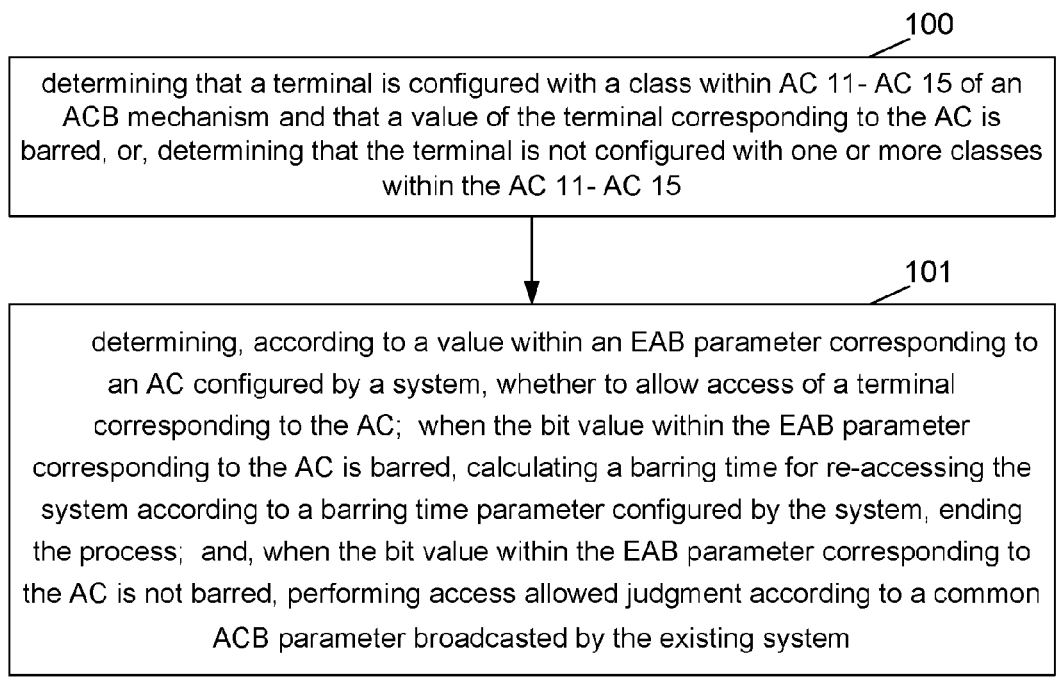
FIG. 1 shows a flowchart of a terminal access method in the disclosure.

FIG. 1 shows a flowchart of a terminal access method in the disclosure; when a system is configured with an ACB parameter and an EAB parameter simultaneously, as shown in FIG. 1, the process includes:

Step 100: determining that a terminal is configured with a class within special AC 11-AC 15 and that a value of the terminal corresponding to the special AC is barred, or, determining that the terminal is not configured with one or more classes within the special AC 11-AC 15.

The terminal mentioned in the disclosure refers to an EAB applicable terminal.

Step 100 specifically includes: the EAB applicable terminal determines whether it is configured with one or more classes within the special AC 11-AC 15; if so, the terminal performs access judgment according to the specific parameter of AC 11-AC 15; specifically, if the specific parameter of the AC 11-AC 15 is configured as that the value of the terminal corresponding to the AC is not barred, then the terminal is allowed to access the system directly and the process is ended; if the specific parameter of the AC 11-AC 15 is configured as that the value of the terminal corresponding to the AC is barred, then it is determined that the terminal is configured with a class within the special AC 11-AC 15 and that the value of the terminal corresponding to the AC is barred, enter the next step. If the terminal is not configured with one or more classes within the special AC 11-AC 15, enter step 101 directly.

Step 101: determining, according to a value within an EAB parameter corresponding to an AC configured by a system, whether to allow access of a terminal corresponding to the AC.

Step 101 specifically includes: if the corresponding AC is determined to be barred according to the EAB parameter, determining that a cell does not allow the access of the terminal, and calculating, according to a barring time parameter configured by the system, a barring time for re-accessing the system indicating that the terminal is not allowed to access the system within a period, and ending the process; and, if the corresponding AC is determined to be not barred according to the EAB parameter, determining that the cell allows the terminal corresponding to the AC to continue performing access judgment, that is, performing access allowed judgment according to a common ACB parameter broadcasted by the existing system. Here, the specific judgment, that is, the use of parameter, belongs to conventional art, for example, a random number is generated randomly and it is compared with a barring factor, and the access is allowed if the random number is less than the barring factor; or, not barred (allowed) or barred is configured in the parameter directly, wherein the specific implementation belongs to a known technology for those skilled in the art, and no further description is needed here.

In the method of the disclosure, the EAB and the existing ACB mechanism are jointly processed, solving the problem of possible impact on a system caused when large numbers of delay-insensitive or low-priority services or terminals access the network simultaneously. Also, during the occurrence of an unexpected event, as the EAB applicable terminal (that is, delay-insensitive low-priority terminal) is provided with appropriate control, this type of terminal is prevented from accessing the system directly without constraints, and the duration of system congestion during the unexpected event is shortened.

Figure 2:
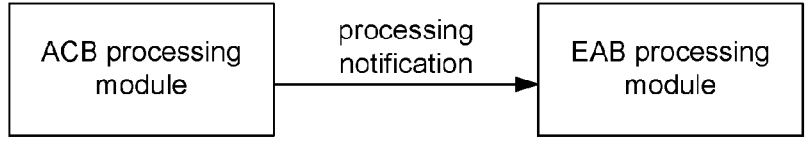
FIG. 2 shows a structure diagram of a terminal access device in the disclosure.

FIG. 2 shows a structure diagram of a terminal access device in the disclosure; as shown in FIG. 2, the device at least includes an ACB processing module and an EAB processing module, wherein the ACB processing module is configured to send a processing notification to the EAB and to perform common (existing) ACB processing;

the EAB processing module is configured to receive the processing notification from the ACB processing module, and to determine, according to a value within an EAB parameter corresponding to an AC configured by a system, whether to allow access of a terminal corresponding to the AC; specifically, the EAB processing module is configured to: if the corresponding AC is determined to be barred according to the EAB parameter, determine that a cell does not allow the access of the terminal and calculate a barring time for re-accessing the system according to a barring time parameter configured by the system; and if the corresponding AC is determined to be not barred according to the EAB parameter, determine that the cell allows the terminal to continue performing access judgment, that is, performing access allowed judgment according to a common ACB parameter broadcasted by the existing system.

The ACB processing module is further used in the following conditions: the terminal determines whether it is configured with one or more classes within special AC 11-AC 15, if so, the terminal performs access judgment according to a specific parameter of the special AC 11-AC 15; specifically: if the specific parameter of the AC 11-AC 15 is configured as that the value of the terminal corresponding to the special AC is not barred, it is determined that the terminal is allowed to access the system directly, then the ACB processing module no longer sends a processing notification to the EAB or sends a no-processing notification to the EAB; if the specific parameter of the AC 11-AC 15 is configured as that the value of the terminal corresponding to the special AC is barred, it is determined that the terminal is configured with a class within the AC11-AC 15 in the ACB mechanism and that the value of the terminal corresponding to the AC is barred, then the ACB processing module sends a processing notification to the EAB, or, it is determined that the terminal is not configured with one or more classes within the special AC11-AC 15, then the ACB processing module sends a processing notification to the EAB.

The ACB processing module is further configured to perform common ACB judgment, that is, continue to perform common ACB judgment when the EAB processing module determines that the terminal is allowed to access the system.

The device of the disclosure can be arranged in a user terminal and the user terminal is an EAB applicable terminal.

Hereinafter, a detailed description is provided in conjunction with an embodiment.

Supposing a system is configured with an ACB parameter and an EAB parameter simultaneously, when a terminal accesses the system, the terminal determines whether it is configured with one or more classes within special AC 11-AC 15; if so, the terminal performs access judgment according to the specific parameter of the special AC 11-AC 15, specifically:

if the specific parameter of the AC 11-AC 15 is configured as that the value of the terminal corresponding to the AC is not barred, the terminal accesses the system directly, and the process is ended;

if the specific parameter of the AC 11-AC 15 is configured as that the value of the terminal corresponding to the AC is barred, the terminal is barred to access the system, at this time, the terminal continues to judge the EAB parameter to determine whether the corresponding AC is barred; if so, the terminal determines that a cell does not allow the access of the terminal and calculates a barring time for re-accessing the system according to a barring time parameter configured by the system, and the process is ended;

if the corresponding AC is determined to be not barred according to the EAB parameter, the terminal determines that the cell allows the terminal to continue performing access judgment; then, the terminal performs access allowed judgment according to a common ACB parameter broadcasted by the system.

It should be noted that, for the emergency call initiated by the EAB applicable terminal, the access control is performed according to existing process.

The above are only the preferred embodiments of the disclosure and are not intended to limit the scope of protection of the disclosure. Any modification, equivalent substitute and improvement made within the spirit and principle of the disclosure are deemed to be included within the scope of protection of the disclosure.

What is claimed is:

1. A terminal access method, comprising: determining, according to a value within an Enhanced Access Barring (EAB) parameter corresponding to an Access Class (AC) configured by a system, whether to allow access of a terminal corresponding to the AC;
    when the corresponding AC is determined to be not barred according to the EAB parameter, then, according to an existing and common Access Class Barring (ACB) parameter broadcasted by the system, performing access allowed judgment.

2. The terminal access method according to claim 1, further comprising: when the corresponding AC is determined to be barred according to the EAB parameter,
    calculating, by the terminal, a barring time for re-accessing the system according to a barring time parameter configured by the system.

3. The terminal access method according to claim 1, further comprising: before determining whether to allow access of a terminal corresponding to the AC, determining that the terminal is configured with one or more classes within special AC 11-AC 15 and that a value of the terminal corresponding to the special AC is barred; or,
    determining that the terminal is not configured with one or more classes within the special AC 11-AC 15.

4. The terminal access method according to claim 3, wherein the determining that the terminal is configured with one or more classes within special AC 11-AC 15 and that a value of the terminal corresponding to the AC is barred comprises:
    determining, by the terminal, whether it is configured with one or more classes within the special AC 11-AC 15; if so, performing access judgment according to a specific parameter of the AC 11-AC 15;
    when the specific parameter of the AC 11-AC 15 is configured as that the value of the terminal corresponding to the AC is not barred, allowing the terminal to access the system directly and ending the process;
    when the specific parameter of the AC 11-AC 15 is configured as that the value of the terminal corresponding to the AC is barred, then determining that the terminal is configured with a class within the special AC 11-AC 15 and that the value of the terminal corresponding to the AC is barred, and executing the determining, according to the value within the EAB parameter corresponding to the AC configured by the system, whether to allow the access of the terminal corresponding to the AC.

5. A terminal access device, at least comprising an Access Class Barring (ACB) processor and an Enhanced Access Barring (EAB) processor, wherein the ACB processor is configured to send a processing notification to the EAB and to perform ACB processing;

the EAB processor is configured to receive the processing notification from the ACB processor, and to determine, according to a value within an EAB parameter corresponding to an Access Class (AC) configured by a system, whether to allow access of a terminal corresponding to the AC; the EAB processor is further configured to: when the corresponding AC is determined to be barred according to the EAB parameter, determine that a cell does not allow the access of the terminal and calculate a barring time for re-accessing the system according to a barring time parameter configured by the system; and, when the corresponding AC is determined to be not barred according to the EAB parameter, determine that the cell allows the terminal to continue performing access allowed judgment according to an existing and common ACB parameter broadcasted by the system.

6. The terminal access device according to claim 5, wherein the ACB processor is further used in the following conditions:

the terminal determines whether it is configured with one or more classes within special AC 11-AC 15, if so, the terminal performs access judgment according to a specific parameter of the special AC 11-AC 15; when the specific parameter of the AC 11-AC 15 is configured as that the value of the terminal corresponding to the special AC is not barred, it is determined that the terminal is allowed to access the system directly, then the ACB processor no longer sends a processing notification to the EAB or sends a no-processing notification to the EAB; when the specific parameter of the AC 11-AC 15 is configured as that the value of the terminal corresponding to the special AC is barred, it is determined that the terminal is configured with a class within the AC 11-AC 15 in the ACB mechanism and that the value of the terminal corresponding to the AC is barred, then the ACB processing module sends a processing notification to the EAB, or, it is determined that the terminal is not configured with one or more classes within the special AC 11-AC 15, then the ACB processor sends a processing notification to the EAB.

7. The terminal access device according to claim 6, wherein the ACB processor is further configured to perform ACB judgment when the EAB processor determines that the terminal is allowed to access the system.

8. The terminal access device according to claim 5, wherein the device is arranged in the terminal, and the terminal is an EAB applicable terminal.

9. The terminal access device according to claim 6, wherein the device is arranged in the terminal, and the terminal is an EAB applicable terminal.

10. The terminal access device according to claim 7, wherein the device is arranged in the terminal, and the terminal is an EAB applicable terminal.

* * * * *